Sept. 29, 1959    E. S. STODDARD ET AL    2,906,685
WATER DEMINERALIZING UNITS
Filed June 29, 1955    3 Sheets-Sheet 1

Fig. 1

INVENTORS
Edgar S. Stoddard
Dominic J. Vallino
BY
Smith, Olsen, Baird & Miller
Attys.

INVENTORS
Edgar S. Stoddard
BY Dominic J. Vallino

Smith, Olsen, Baird & Miller,
Attys.

United States Patent Office 2,906,685
Patented Sept. 29, 1959

2,906,685

WATER DEMINERALIZING UNITS

Edgar S. Stoddard, Berwyn, and Dominic J. Vallino, Cicero, Ill., assignors to General Electric Company, a corporation of New York Application June 29, 1955, Serial No. 518,858

19 Claims. (Cl. 204—264)

The present invention relates to water demineralizing units and more particularly to such units that are especially designed to be incorporated directly in existing home water supply systems with only minimum plumbing changes.

In hard-water areas, the raw water supply is altogether unsuitable for many purposes and is particularly unsuitable for washing operations, since the calcium and magnesium ions of the corresponding salts dissolved therein effect the precipitation of calcium and magnesium salts of higher fatty acids (oleates, palmates, etc.) derived from soap products employed in such washing operations.

In order to minimize the precipitation of the calcium and magnesium salts of such higher fatty acids in washing operations, ion exchange apparatus of the zeolite type is generally employed in home water supply systems in hard-water areas; which apparatus effects the exchange or substitution of sodium ions for calcium and magnesium ions in the raw water, since the sodium salts of such higher fatty acids are much more soluble than the corresponding calcium and magnesium salts thereof. However, such apparatus does not demineralize the raw water in the general sense of reducing the total dissolved solids count therein, rather it only softens the raw water in the special sense of substituting sodium ions for calcium and magnesium ions therein.

Now while this type of softening of raw water is highly useful in some washing operations, it is of only limited utility in other washing operations. For example, in automatic dishwashing apparatus frequently the final step involves subjecting the dishes to a blast of hot air to effect drying of the water remaining thereon following the preceding rinsing step; whereby glassware is visibly spotted by salt deposits thereon in the event the total dissolved solids count of the rinse water is high, even though the rinse water has been treated by ion exchange apparatus of the zeolite type to effect softening thereof. Moreover, there are other chemical reactions that are carried out in the presence of water, wherein the sodium ions that are introduced into the treated water by such ion exchange apparatus, are far more objectionable than the calcium or magnesium ions contained in the raw water.

Accordingly, it is a general object of the invention to provide a unit for treating raw water that is especially designed for use in a home-water supply system and that effects demineralization of the water, as contrasted with the substitution of sodium ions for calcium and magnesium ions, whereby the total dissolved solids count of the water is substantially reduced.

Another object of the invention is to provide a water demineralizing unit of the character noted that is entirely automatic, requiring no re-charging or other care by the home owner.

Another object of the invention is to provide a water demineralization unit of improved and simplified construction and arrangement and that is economical in operation.

A further object of the invention is to provide a water demineralizing unit of compact and simple construction and arrangement, but having a latent ion exchange capacity equivalent to the normal daily requirements of hot water in a home.

A still further object of the invention is to provide an improved hot water supply system that incorporates both a water demineralizing unit of the character described, and a water heating unit, wherein the operating characteristics of the two units are so correlated that the recoveries of the respective individual operating functions thereof are maintained in proper balance to supply the required volumetric demand of treated water that is both of the relatively low dissolved solids count and of the relatively high temperature, as required.

Further features of the invention pertain to the particular arrangement of the elements of the water demineralizing unit and of the hot water supply system whereby the above-outlined and additional operating features thereof are attained.

The invention, both as to its organization and method of operation, together with further objects and advantages thereof, will best be understood by reference to the following specification taken in connection with the accompanying drawings, in which.

Referring now to Figs. 1 to 5, inclusive, of the drawings, the water demineralizing unit 10 there illustrated and embodying the features of the present invention comprises an upstanding substantially cylindrical body 11 formed of mild steel and provided with two opposed apron sections 12 at the bottom thereof and constituting a base, as well as an outwardly directed annular flange 13 at the top thereof. A substantially annular bottom header 14 formed of mild steel is arranged in the lower end of the body 11 just above the base 12, the lower header 14 being inwardly dished and provided with a surrounding marginal flange 15 engaging the adjacent lower portion of the body 11 and suitably secured thereto, in liquid-tight relation, as by welding, so as to provide a general tank-like structure. Arranged within the lower portion of the body 11 and carried by the lower header 14 is a substantially cylindrical skirt 16 formed of mild steel and provided with an outwardly directed annular flange 17 at the bottom thereof and an inwardly directed annular flange 18 at the top thereof. The skirt 16 is arranged inwardly with respect to the adjacent lower portion of the body 11 and the annular flange 17 is secured to the adjacent portion of the lower header 14 in liquid-tight relation therewith, as by welding.

Figure 1:
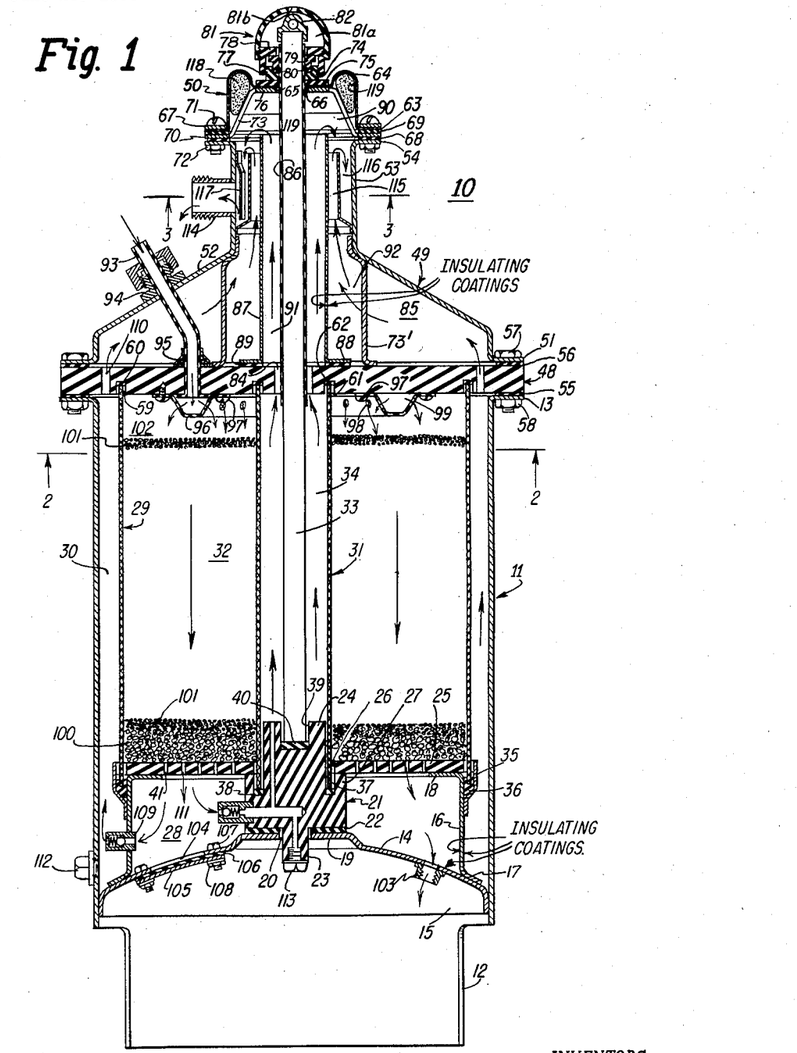
Figure 1 is a vertical longitudinal sectional view of a water demineralizing unit embodying the present invention.
Figure 2:
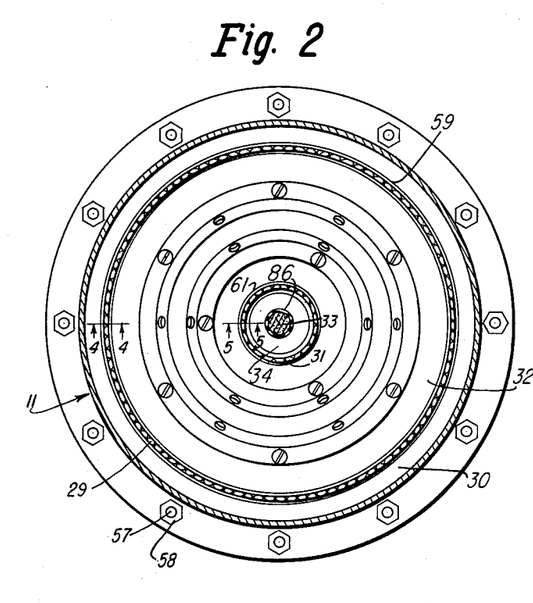
Fig. 2 is a horizontal lateral sectional view of the intermediate portion of the unit, this view being taken in the direction of the arrows along the line 2—2 of Fig. 1.
Figure 3:
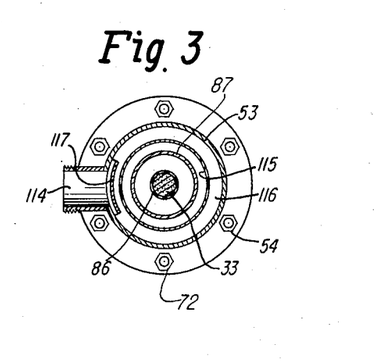
Fig. 3 is a horizontal lateral sectional view of the upper portion of the unit, this view being taken in the direction of the arrows along the line 3—3 in Fig. 1.

The central portion of the lower header 14 is provided with a substantially centrally disposed upwardly directed and offset base portion 19 having a centrally disposed opening 20 therein; and an upstanding substantially cylindrical insulating bushing 21 is secured in liquid-tight relation with the base 19 by an arrangement including a substantially annular interposed gasket 22. The details of the securing means mentioned are not shown in the interest of simplification. Preferably, the insulating bushing is formed of a molded thermosetting material, such, for example, as phenol-formaldehyde condensation products, or "Bakelite"; while the gasket 22 may be formed of chloroprene, or the like. The bushing 21 is provided with a central downwardly extending portion 23 projecting through the opening 20 provided in the base 19, as well as a central upwardly extending portion 24 projecting into the central portion of the body 11. Also arranged in the lower portion of the body 11, is a substantially annular disk-like insulating plate 25, having an enlarged central opening 26 therein, the outer peripheral portion of the plate 25 being supported upon the inwardly directed annular flange 18 carried by the skirt 16, and the inner peripheral portion of the plate 25 being carried by a substantially annular ledge 27 provided on the bushing 21. Preferably the plate 25 is also formed of molded thermosetting material, such, for example, as phenol-formaldehyde condensation products. Accordingly, the plate 25 cooperates with the skirt 16, the bushing 21 and the lower header 14 to define a substantially annular lower compartment 28 mutually therebetween.

Also, the unit 10 comprises a first upstanding substantially cylindrical barrier 29 arranged within the body 11 and spaced inwardly with respect thereto and cooperating therewith to define an upstanding substantially annular chamber 30 therebetween, a second upstanding substantially cylindrical barrier 31 arranged within the first barrier 29 and spaced inwardly with respect thereto and cooperating therewith to define an upstanding substantially annular chamber 32 therebetween, and an upstanding substantially rod-like member 33 arranged within the second barrier 31 and spaced inwardly with respect thereto and cooperating therewith to define an upstanding substantially annular chamber 34 therebetween. In the arrangement, the elements 33, 31, 29 and 11 are disposed in concentric relationship, the innermost element 33 being disposed along the central vertical longitudinal axis of the unit 10; and also the elements 11 and 33 respectively comprise a cathode and an anode. Thus: the annular chamber 30 disposed between the cathode 11 and the barrier 29 constitutes a catholyte chamber; the annular chamber 32 disposed between the two barriers 29 and 31 constitutes a raw water-treatment chamber; and the annular chamber 34 disposed between the barrier 31 and the anode 33 constitutes an anolyte chamber.

The lower end of the barrier 29 is supported upon the skirt 16 by an arrangement including an upstanding substantially band-like element 35 secured to the skirt 16 adjacent to the top thereof and in surrounding relation therewith, the band 35 being formed of mild steel and secured in liquid-tight relation with the skirt 16, as by welding. Accordingly, a substantially annular pocket is defined between the skirt 16 and the band 35 and receives a substantially annular sealing gasket 36, that, in turn, supports the lower edge of the barrier 29. The lower end of the barrier 31 is supported upon the bushing 21 within a substantially annular groove 37 formed in the upper portion thereof and arranged between the central portion 24 and the annular ledge 27; an annular sealing gasket 38 being arranged in the bottom of the annular groove 37, that, in turn, supports the lower edge of the barrier 31. Also, the lower end of the anode 33 is supported upon the bushing 21 within a substantially cylindrical recess 39 formed in the central portion 24 thereof; a substantially disk-like sealing gasket 40 being arranged in the bottom of the recess 39, that, in turn, supports the lower end of the anode 33. In the arrangement, the sealing gaskets 36, 38 and 40 may also be formed of chloroprene; whereby the catholyte chamber 30 is sealed from the treatment chamber 32, and the treatment chamber 32 is sealed from the anolyte chamber 34. At this point, it is noted that a number of holes 41 are arranged through the lower plate 25 so as to place the treatment compartment 32 and the lower compartment 28 in communication with each other through the holes 41.

Figure 4:
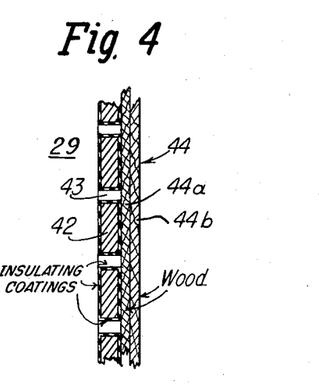
Fig. 4 is a greatly enlarged vertical sectional view or development of the composite outer barrier incorporated in the unit, this view being taken in the direction of the arrows along the line 4—4 in Fig. 2.

As best shown in Fig. 4, the barrier 29 is of composite construction and comprises an outer substantially sleeve-like support 42 in the form of a sheet of mild steel having perforations 43 formed therethrough, and an inner substantially sleeve-like diaphragm 44 in the form of two layers or sheets 44a and 44b of close-cellulose type structure. Specifically, the sheets 44a and 44b are formed of wood and wrapped into a sleeve-like form interiorly of the support 42; the wood of the sheets 44a and 44b being selected from the class consisting of poplar, Douglas fir and white pine, poplar having been found to be most satisfactory. In the barrier 29, the seams between the adjacent edges of the two sheets of wood 44a and 44b are sealed with a suitable water-insoluble cement, such as the rubber-like cement sold as "Plio-bond." The composite structure of the barrier 29 is very advantageous as the strong outer steel sheet 42 prevents rupture of the inner wooden diaphragm 44 under the outward pressure of the water in the treatment chamber 32, as explained more fully hereinafter, while the diaphragm 44 accommodates the passage therethrough of the cations involved in the electrodialysis, as explained subsequently.

Figure 5:
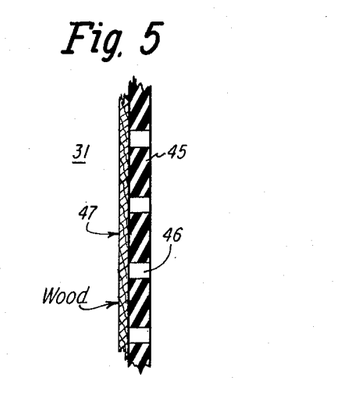
Fig. 5 is a greatly enlarged vertical sectional view or development of the composite inner barrier incorporated in the unit, this view being taken in the direction of the arrows along the line 5—5 in Fig. 2.

As best shown in Fig. 5, the barrier 31 is of composite construction and comprises an inner substantially sleeve-like support 45 formed of molded thermoplastic material, such, for example, as the methyl-methacrylate resin known as "Lucite," having perforations 46 formed therethrough, and an outer substantially sleeve-like diaphragm 47 in the form of a layer or sheet of close-cellulose structure. Specifically, the sheet 47 is formed of wood and wrapped into a sleeve-like form exteriorly of the support 45; the wood of the sheet 47 being selected from the class consisting of popular, Douglas fir and white pine, poplar having been found to be the most satisfactory. In the barrier 31, the seam between the adjacent edges of the sheet of wood 47 is sealed with a suitable water-insoluble cement, such as the rubber-like cement sold as "Plio-bond." The composite structure of the barrier 31 is very advantageous as the strong inner molded support 45 prevents rupture of the inner wooden diaphragm 47 under the inward pressure of the water in the treatment chamber 32, as explained more fully hereinafter; while the diaphragm 47 accommodates the passage therethrough of the anions involved in the electrodialysis, as explained subsequently.

Further, the unit 10 comprises a substantially disk-like upper plate or header 48 formed of insulating material, such, for example, as the phenol-formaldehyde condensation products known as "Bakelite," and carried upon the annular flange 13, as well as an upstanding dome including lower and upper sections 49 and 50 and carried by the upper header 48. More particularly, the lower dome section 49 is formed of mild steel and comprising a lower surrounding annular flange 51, an upwardly and inwardly directed substantially frustoconical intermediate wall 52, an upstanding substantially cylindrical upper wall 53 and an upper surrounding annular flange 54. The peripheral lower edge of the upper header 48 is sealed to the annular flange 13 by an arrangement including an interposed sealing gasket 55; and the peripheral upper edge of the upper header 48 is sealed to the annular flange 51 by an arrangement including an interposed sealing gasket 56. The sealing gaskets 55 and 56 may be formed of chloroprene and are secured in place by an arrangement including an annular series of bolts 57, extending through aligned openings in the elements 51, 56, 48, 55 and 13, and provided with cooperating nuts 58.

The top end of the barrier 29 is arranged in an annular groove 59 formed in the upper header 48 in engagement with an annular sealing gasket 60 disposed in the top of the groove 59; and likewise, the top end of the barrier 31 is arranged in an annular groove 61 formed in the upper header 48 in engagement with an angular sealing gasket 62 disposed in the top of the groove 61. The gaskets 60 and 62 may also be formed of chloroprene; whereby the top of the chambers 30 and 32 are sealed with respect to each other, and the top of the chambers 32 and 34 are sealed with respect to each other.

The upper dome section 50 is formed of sheet lead and comprises a lower outwardly directed surrounding annular flange 63, an upwardly and inwardly directed wall 64 and an upper inwardly directed surrounding annular flange 65 having a centrally disposed opening 66 therethrough, through which the upper end of the anode 33 extends. The annular flanges 54 and 63 are secured together in gas-tight relation by an arrangement including a clamping ring 67, lower and upper annular sealing gaskets 68 and 69, an an interposed ring 70, the elements 67, 63, 69, 70, 68 and 54 being retained in place by an annular series of screws 71 provided with cooperating nuts 72. The gaskets 68 and 69 may also be formed of chloroprene, while the rings 67 and 70 are formed of mild steel, the ring 70 being provided with a number of angularly spaced-apart and upwardly directed struts 73 serving to support the intermediate wall 64 of the upper dome section 50. Moreover, a number of upwardly directed and angularly spaced-apart steel struts 73' are arranged between the upper header 48 and the junction between the walls 52 and 53 of the lower dome section 49 for the purpose of lending rigidity thereto.

A substantially annular insulating collar 74 is arranged on top of the annular flange 65 and secured thereto in gas-tight relation by an arrangement including an interposed annular gasket 75 and a clamping ring 76, the clamping ring 76 being formed of mild steel and carried by the upper ends of the struts 73, and the collar 74 surrounding the upper end of the anode. Another annular insulating collar 77 is detachably secured in surrounding relation with the upper end of the collar 74 by cooperating threads respectively carried thereby; which collar 77 is provided with an inwardly directed annular ledge 78 surrounding the upper end of the anode 33 and engaging an annular insulating packing ring 79 disposed in an annular recess formed in the top end of the collar 74 and surrounding the upper end of the anode 33. Further, an annular resilient sealing ring 80 is arranged in the annular recess formed in the top end of the collar 74 and below the lower end of the packing ring 79; whereby downward movement of the packing ring 79, resulting from screwing the collar 77 downwardly tightly upon the collar 74, effects compression of the sealing ring 80, so that it is deformed into engagement with the upper end of the anode 33 to seal the same to the collar 74. Further, a substantially dome-shaped insulating cap 81 is removably secured to the collar 77, the interior surface of the cap 81 and the exterior surface of the upper end of the collar 77 carrying cooperating threads for this purpose. In the arrangement, the collars 74 and 77, the packing ring 79 and the cap 81 are formed of thermoset material, such as the phenol-formaldehyde condensation products known as "Bakelite," while the sealing gasket 75 and the sealing ring 80 are formed of chloroprene. The cap 81 is hollow and defines a pocket 81a in the top thereof, wherein there is arranged an electrical terminal 82 carried upon the top end of the anode 33, a central hole 81b being arranged in the top of the cap 81 to accommodate a power cable, not shown, extending between the electrical terminal 82 and an exterior circuit network.

In view of the foregoing, it will be understood that the top end of the anode 33 carries the electrical terminal 82 arranged in the pocket 81a formed in the cap 81, while the bottom end of the anode 33 is arranged in the recess 39 formed in the top of the central portion 24 of the bushing 21; whereby the anode 33 extends vertically longitudinally through the anolyte chamber 34, thence through a centrally disposed opening 84 provided in the upper header 48, thence through an upper compartment 85 defined between the upper header 48 and the dome sections 49 and 50, and then through the collar 74 and the packing ring 79 into the pocket 81a formed in the cap 81; and the upper portion of the anode 33 is enclosed in a tubular insulating sleeve 86 commensurate with the extension thereof through the upper compartment 85; which sleeve 86 is formed of the thermoset phenol-formaldehyde condensation products known as "Bakelite."

A substantially cylindrical baffle 87 formed of mild steel is arranged in the upper compartment 85 in surrounding relation with the tubular sleeve 86 and spaced outwardly therefrom, and also spaced inwardly from the dome sections 49 and 50, the bottom end of the baffle 87 being provided with an outwardly directed annular flange 88 supported by the upper header 48 with a sealing gasket 89 therebetween and secured in place by a number of screws not shown, the gasket 89 being formed of chloroprene. The top end of the baffle 87 terminates adjacent to the junction between the lower and upper dome sections 49 and 50; whereby a gas pocket 90 is formed in the top of the upper compartment 85 above the top of the baffle 87, and the lower portion of the upper compartment 85 is divided by the baffle 87 into inner and outer sections 91 and 92, respectively, so that the extension of the anode 33 through the upper compartment 85 is in fact, through the inner section 91 thereof and interiorly of the baffle 87.

Raw water to be demineralized is supplied from the exterior into the top of the treatment chamber 32 by an arrangement including an insulating conduit 93 formed of the thermoplastic material comprising vinylidene chloride polymers and copolymers, known as "Saran"; which conduit 93 extends through a packing gland 94 formed of mild steel and carried by the intermediate wall 52 of the lower dome section 49. Thence the conduit 93 extends through a packing gland 95 formed of chloroprene and carried by the upper header 48, the extreme lower end of the conduit 93 communicating with an annular hollow distributing ring 96 formed of phenol-formaldehyde condensation products known as "Bakelite" and arranged in the top of the treatment chamber 32. More particularly, the distribution ring 96 is secured to the under surface of the upper header 48 by a number of screws 97 and between the top ends of the barriers 29 and 31. The distribution ring 96 has inner and outer annular arrays of holes 98 and 99 formed therein and communicating directly with the top of the treatment chamber 32. An annular layer or bed 100 of sharp gravel is supported upon the plate 25 in the lower portion of the treatment chamber 32; and an upstanding annular bed 101 of ion exchange material is supported upon the bed 100, the beds 101 and 100 being porous and accommodating the ready passage therethrough of the raw water undergoing treatment. More particularly, the bed 101 is of the mixed type comprising both cation exchange material and anion exchange material (heterogeneously mixed) and extends upwardly adjacent to the distributing ring 96 so as to define a water pocket 102 above the bed 101 and below the upper header 48 in the top of the treatment chamber 32, the gravel of the bed 100 being sufficiently coarse that it is not washed through the holes 41 in the plate 25, and the bed 100 being sufficiently thick that the ion exchange material of the bed 101 is not washed therethrough and through the holes 41 in the plate 25. Accordingly, the raw water to be demineralized in introduced through the conduit 93 into the distributing ring 96 and distributed thereby into the water pocket 102; then the water percolates through the beds 101 and 100 downwardly through the treatment chamber 32 and thence through the holes 41 in the plate 25 into the lower compartment 28. In passing through the bed 101 the raw water is subjected to ion exchange and is demineralized, as explained more fully hereinafter, before it is collected in the lower compartment 28.

An outlet fixture 103 is carried by the lower header 14 and communicates with the lower compartment 28 for the purpose of conducting the demineralized water to the exterior for use; and also, a clean-out hole 104 is provided in the lower header 14, the hole 104 being provided with a removable cover 105 that is normally secured in place in liquid-tight relation with the lower header 14 by an arrangement including a sealing gasket 106 formed of chloroprene and a series of bolts 107 provided with cooperating nuts 108. The lower compartment 28 communicates with the bottom of the catholyte chamber 30 via a passage formed in the skirt 16 and in which a check valve 109 is arranged; whereby a first small stream of the demineralized water is conducted from the lower compartment 28 into the bottom of the catholyte chamber 30 and flows upwardly as a catholyte therethrough and thence through an annular series of holes 110 formed through the upper header 48 into the outer lower section 92 of the upper compartment 85, the check valve 109 preventing backflow of the catholyte into the lower compartment 28. Similarly, the lower compartment 28 communicates with the bottom of the anolyte chamber 34 via a passage formed in the bushing 21 and in which a check valve 111 is arranged; whereby a second small stream of the demineralized water is conducted from the lower compartment 28 into the bottom of the anolyte chamber 34 and thence through the opening 84 formed through the upper header 48 into the inner lower section 91 of the upper compartment 85, the check valve 111 preventing back-flow of the anolyte into the lower compartment 28. A drain opening is provided in the cathode 11 and communicating with the bottom of the catholyte chamber 30; this drain opening being normally closed by a removable plug 112. Similarly, a drain opening is provided in the bushing 21 and communicating with the bottom of the anolyte chamber 34; this drain opening being normally closed by a removable plug 113.

A drain fixture 114 is carried by the wall 53 of the lower dome section 49 below the top of the baffle 87; and an upstanding substantially cylindrical baffle 115 formed of mild steel is arranged within the wall 53 in surrounding relation with the baffle 87, the bottom of the baffle 115 being outwardly flared and sealed to the adjacent portion of the wall 53, and the top of the baffle 115 terminating below the top of the baffle 87. Thus, the baffle 115 cooperates with the wall 53 to define an upstanding substantially annular mixing chamber 116 therebetween; and a downwardly directed baffle 117 is arranged in the mixing chamber 116 adjacent to the drain fixture 114 and spaced inwardly with respect thereto, so as to define a communication between the bottom of the mixing chamber 116 and the drain fixture 114. Accordingly, the catholyte rises in the outer lower section 92 of the upper compartment 85 between the baffles 87 and 115, and then spills over the top of the baffle 115 into the mixing chamber 116. Similarly, the anolyte rises in the inner lower section 91 of the upper compartment 85 between the sleeve 86 surrounding the anode 33 and the baffle 87, and then spills over the top of the baffle 87 into the catholyte spilling over the top of the baffle 115. Hence, the mixture of the catholyte and the anolyte spills into the mixing chamber 116, then flows downwardly therein under the bottom of the baffle 117, then flows upwardly into the drain fixture 114, and thence to the exterior of the unit 10.

In the operation of the unit 10, as explained more fully hereinafter: the water undergoing treatment and flowing downwardly through the treatment chamber 32 is in wetting relation with the barriers 29 and 31 and with the ion exchange bed 101; the catholyte flowing upwardly in the catholyte chamber 30 is in wetting relation with the cathode 11 and the barrier 29; and the anolyte flowing upwardly in the anolyte chamber 34 is in wetting relation with the barrier 31 and the anode 33. Moreover, some hydrogen gas is liberated at the cathode 11 and swept along with the catholyte into the outer section 92 of the upper compartment 85, and some oxygen gas is liberated at the anode 33 and swept along with the anolyte into the inner section 91 of the upper compartment 85; which gases are separated from the mixture of the catholyte and the anolyte in the mixing chamber 116 and rise into the gas pocket 90.

In order to dispose of these gases, and also to eliminate the possibility of an uncontrolled reaction therebetween, a mass 118 of catalyst is confined in a substantially annular porous bag 119 (canvas, or the like) and arranged in the gas pocket 90. As illustrated, the bag 119 is arranged in the top of the gas pocket 90 between the struts 73 and the wall 64 of the upper dome section 50. The mass of catalyst 118 may comprise platinum, or other agent, capable of inducing a controlled water-producing reaction between the hydrogen and the oxygen gases, thereby eliminating any explosion hazard. However, as a safety measure, the upper dome section 50 is formed of lead sheet, while the lower dome section 49 is formed of steel sheet; and moreover, the sheet of the upper dome section 50 is considerably thinner than the sheet of the lower dome section 49; whereby the upper dome section 50 is altogether weaker than the lower dome section 49. In fact, the upper dome section 50 comprises the weakest section in the whole of the structure of the unit 10; whereby it constitutes an explosion head insuring immediate rupture thereof before gas pressure of any substantial magnitude can build-up in the unit 10; thereby positively eliminating the possibility of any substantial or high-pressure explosion within the unit 10. The arrangement of the explosion head 50, as described above, comprises a positive safety device that is recommended only in the event the unit 10 is to be employed in a home installation, as the probability of such an explosion is exceedingly small, rendering this precaution generally unnecessary in an industrial installation.

Considering now in greater detail the character of the ion exchange bed 101, it is noted that it essentially comprises a loosely packed mass of first discrete particles of cation exchange material (preferably a synthetic organic polymeric cation exchange resin) and of second discrete particles of anion exchange material (preferably a synthetic organic polymeric anion exchange resin) the two types of discrete particles mentioned being heterogeneously mixed and the proportions of the two types of particles mentioned being such that substantially equal cation exchange and anion exchange capacities are possessed by the bed 101; and it is noted that the bed 101 accommodates the ready passage therethrough of the water undergoing treatment, without substantial diminution of pressure between the raw water in the inlet conduit 93 and the treated water in the outlet fixture 103.

More particularly, this cation exchange resin is of bead-like formation and may comprise the strong-acid resin sold under the name: "Amberlite IR–120"; and this anion exchange resin is of bead-like formation and may comprise the strong-base resin sold by Rohm and Haas under the names "Amberlite IRA–400" and "Amberlite IRA–410." A cation exchange resin of the type specified essentially comprises a stable insoluble synthetic organic polymer, active acidic functional groups chemically bonded thereto and dissociable into free mobile cations to impart a negative charge to the polymer, and water in gel relationship with the polymer. Similarly, an anion exchange resin of the type specified essentially comprises a stable insoluble synthetic organic polymer, active basic functional groups chemically bonded thereto and dissociable into free mobile anions to impart a positive charge to the polymer, and water in gel relationship with the polymer. The active acidic functional groups attached to the associated organic polymer are oriented with respect to the interfaces thereof so as to be partially or completely dissociable in the internal gel water into fixed negative ions linked to the polymer and into mobile exchangeable positive ions; and similarly, the active basic functional groups attached to the associated organic polymer are oriented with respect to the interfaces thereof so as to be partially or completely dissociable in the internal gel water into fixed positive ions linked to the polymer and into mobile exchangeable negative ions.

Typical such polymers to which active acidic functional groups may be attached include: phenol-aldehyde resins, polystyrene-divinylbenzene copolymers, and the like; and such suitable active acidic functional groups include: $-SO_3H$, $-COOH$, and the like; $-SO_3H$ being usually preferred because of its high dissociation constant. Typical such polymers to which active basic functional groups may be attached include: urea-formaldehyde resins, melamine-formaldehyde resins, polyalkylene-polyamine-formaldehyde resins, and the like; and such suitable active basic functional groups include: quaternary ammonium hydroxides, amino groups, the guanidyl group, the dicyanodiamidine group, and like organic nitrogen-containing basic groups, the quaternary ammonium hydroxide groups, the guanidine and the dicyanodiamidine residue being usually preferred because of their high dissociation constants. Normally the water in gel relationship with the polymer should be present in an amount of at least 15% of the weight of the dry resin.

As explained more fully hereinafter, a source of direct current is provided that includes positive and negative terminals, the positive terminal being ungrounded and the negative terminal being grounded; and a voltage in the general range 40–50 volts being maintained between the positive and negative terminals. The positive terminal is attached to a cable, not shown, that extends through the hole 81b in the cap 81 and is connected to the electrical terminal 82 and consequently to the anode 33; while the cathode 11, the lower dome section 49 and the upper dome section 50 are connected to ground and consequently to the negative terminal; whereby the direct voltage mentioned appears between the anode 33 and the cathode 11 so that a direct current flows from the anode 33 through the anolyte, the barrier 31, the water undergoing treatment, as well as the ion exchange bed 101, the barrier 29 and the catholyte to the cathode 11; whereby the water undergoing treatment in the treatment compartment 32 is subjected to electrodialysis and the ion exchange bed 101 is subjected to ion regeneration.

In order to maximize the passage of the direct current from the anode 33 to the cathode 11 and consequently through the ion exchange bed 101, the passage of the direct current to and through other of the constructional elements that are also at ground potential is minimized by coating such elements with a suitable electrical insulating material such as the rubber-like coating material sold as "Plastisol." Specifically, the interior surface of the bottom header 14, and all of the exposed surfaces of the skirt 16, the band 35, the sleeve-like support 42 of the barrier 29 and the baffle 87 are all coated with the insulating layer mentioned. These insulating coatings, carried by the elements named are not illustrated in Fig. 1 of the drawings, but are indicated by the legends applied thereto; whereas these insulating coatings are directly illustrated and also indicated by the applied legend in Fig. 4 of the drawings.

Considering now a constructional example of the unit 10 (especially designed for incorporation in a hot water supply system for home use), it is noted: the internal diameter of the cathode 11 may be about 19¾"; the internal diameter of the barrier 29 may be about 17⅜"; the internal diameter of the barrier 31 may be about 3"; the external diameter of the anode 33 may be about 1"; the height of the treatment chamber 32 between the upper surface of the plate 25 and the lower surface of the upper header 48 may be about 17⅜"; the gravel bed 100 may have a thickness between the top of the plate 25 and the bottom of the ion exchange bed 101 of about 2"; and the top of the ion exchange bed 101 may approach the bottom of the distributing ring 96 within about 1". With this construction, the combined volume of the cation exchange resin and the anion exchange resin in the bed 101 arranged in the treatment compartment 32 is about 1.6 cubic feet; the lower compartment or collection reservoir 28 has a volume of about 4 gallons of treated water; the ion exchange bed 101 has a latent capacity for demineralizing about 50 gallons of raw water, at ambient temperature (about 40° F.), so as to reduce the total dissolved solids count thereof from 800 p.p.m. to 35 p.p.m.; and the unit 10 is capable of supplying demineralized water at a rate of about 5 gallons per minute. The above-mentioned latent capacity of the ion exchange bed 101 to demineralize the raw water as noted above is based upon the assumption that 15.5% of the theoretical total ion exchange capacities of these quantities of these particular ion exchange resins are available for ion exchange purposes, by virtue of the prior regeneration of the ion exchange bed 101 by the electrical system, as explained more fully hereinafter; which assumption is entirely modest and well within the operating characteristics of the unit 10.

Figure 6:
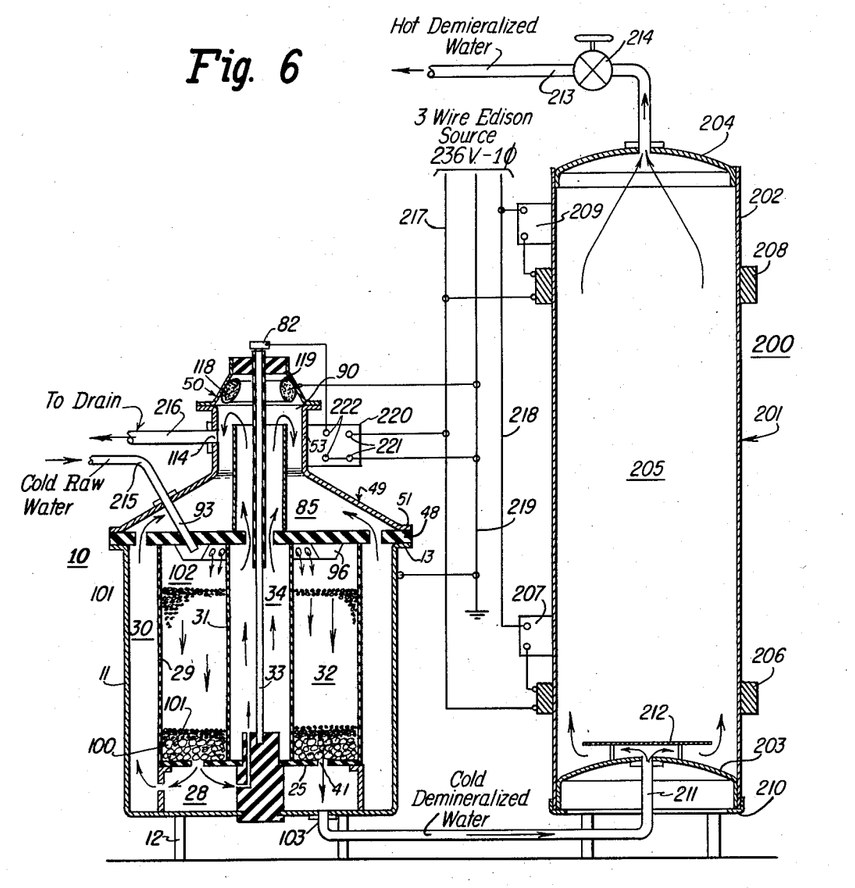
Fig. 6 is a schematic diagram of a hot water supply system, embodying the present invention, and incorporating the water demineralizing unit of Figs. 1 to 3, inclusive, as well as a water heating unit, and illustrating the electric power supply system for these two units.

The mode of operation of the unit 10 will best be understood by reference to Fig. 6, wherein there is schematically illustrated a hot water supply system, especially designed for home use, and comprising the water demineralizing unit 10, and also a water heating unit 200. In this system, it is contemplated that the unit 200 may comprise a conventional electric water heater including a storage tank 201 provided with an upstanding substantially cylindrical side wall 202, a bottom header 203 and a top header 204; whereby a water storage compartment 205 is defined within the tank 201 that has a storage capacity of at least about 50 gallons. Also, the water heater 200 comprises a lower electric heating element 206 provided with an associated thermostatic switch 207 operatively associated with the lower portion of the side wall 202, as well as an upper electric heating element 208 provided with an associated thermostatic switch 209 operatively associated with the upper portion of the side wall 202. Also, the water heater 200 comprises a supporting base 210 that is carried by the supporting floor, as well as a heat-insulating jacket, not shown. An inlet conduit 211 communicates with the lower portion of the storage chamber 205 through the central portion of the lower header 203, a diffusion baffle 212 being arranged in the lower portion of the storage chamber 205 in covering relation with the inlet conduit 211 so as to prevent undesirable mixing of the incoming cold water with the stored hot water. An outlet conduit 213 communicates with the upper portion of the storage chamber 205 through the central portion of the upper header 204, which outlet conduit 213 comprises the hot water supply pipe for the home and is provided with a control valve, indicated at 214, that is employed for the purpose of controlling the flow of the hot water from the storage chamber 205 via the hot water supply conduit 213 to the exterior.

The unit 10 is carried by the supporting floor adjacent to the unit 200, and is supplied with cold raw water under pressure via a supply conduit 215 that is connected to the city water main; which supply conduit 215 is connected to the inlet conduit 93 communicating with the distributing ring 96; and the outlet fixture 103 from the lower compartment 28 is connected to the conduit 211 extending to the water heater 200. The drain fixture 114 communicating with the upper compartment 85 is connected to a drain conduit 216 extending to drain plumbing, not shown.

The units 10 and 200 are operated from a 3-wire Edison electric power source of 236-volts single-phase including two outside conductors 217 and 218 and a grounded neutral conductor 219. The heating element 206 is connected across the outside conductors 217 and 218 via the thermostatic switch 207; and likewise, the heating element 208 is connected across the outside conductors 217 via the thermostatic switch 209. The unit 10 comprises a power rectifier 220 that may be of any suitable type, such, for example, as a selenium crystal rectifier, and provided with a pair of input terminals 221 respectively connected to the outside conductor 217 and to the grounded neutral conductor 219, and a pair of output terminals 222 respectively connected to the electrical terminal 82 and to the grounded neutral conductor 219. Also, the cathode 11 and the lower and upper dome sections 49 and 50 are connected to the grounded neutral conductor 219 in order positively to insure grounding of these elements.

In the operation of the system, when the valve 214 is opened and subsequently closed, a corresponding volume of hot demineralized water flows from the upper portion of the storage chamber 205 via the hot water supply pipe 213 to the exterior of the system for use; whereby a corresponding volume of cold demineralized water flows from the lower compartment 28 via the conduit 211 into the lower portion of the storage chamber 205; and whereby a corresponding volume of cold raw water flows from the cold water supply pipe 215 into the treatment chamber 32 and thence downwardly through the ion exchange bed 101 into the lower compartment 28. The cold demineralized water conducted into the lower portion of the storage chamber 205 is heated therein, and the cold raw water conducted into the upper portion of the treatment chamber 32 is demineralized therein. Specifically, in the operation of the water heater 200, when the thermostatic switch 207 indicates that the water in the lower portion of the storage chamber 205 has a temperature below that preset, it operates to close the circuit for energizing the heating element 206 in order to effect the required heating of the water in the lower portion of the storage chamber 205, so that subsequently the thermostatic switch 207 operates to interrupt the circuit for energizing the heating element 206 upon recovery of the temperature of the water in the lower portion of the storage chamber 205 to that preset. The operation of the thermostatic switch 209 in response to the temperature of the water in the upper portion of the storage compartment 205 for the purpose of controlling the energization of the heating element 208 is fundamentally the same as that of the thermostatic switch 207. However, it is noted that in the normal operation of the water heater 200, unless an abnormally heavy demand for hot water is made, the required heating may be effected entirely by the lower heating element 206 under the control of the thermostatic switch 207. As the cold raw water passes downwardly through the treatment chamber 32 into contact with the ion exchange bed 101, it is quickly demineralized with the result that the latent ion exchange capacity of the ion exchange bed 101 is quickly reduced. Specifically, the cations of the salts dissolved in the raw water are exchanged for hydrogen ions by the cation exchange material and the anions of the salts dissolved in the raw water are exchanged for hydroxyl anions by the anion exchange material, thereby positively demineralizing the water in the treatment chamber 32 and preserving the neutrality thereof, the pH being maintained at about 7.0, as a consequence of the exchange of approximately equal proportions of hydrogen ions and hydroxyl ions and the introduction thereof into the water undergoing the treatment.

Subsequently, and after closure of the valve 214, the ion exchange bed 101 is subjected to ion regeneration as time proceeds, the cations and the anions carried by the respective cation and anion exchange materials being gradually re-exchanged for hydrogen ions and hydroxyl ions from the water in the treatment chamber 32, and subjected to electrodialysis, so that the cations proceed through the barrier 29 and into the catholyte moving upwardly in the catholyte chamber 30, and so that the anions proceed through the barrier 31 into the anolyte moving upwardly in the anolyte chamber 34. Accordingly, the cations mentioned are carried by the catholyte into the upper compartment 85 and the anions mentioned are carried by the anolyte into the upper compartment 85, the catholyte and the anolyte being subsequently mixed therein and discharged via the drain fixture 114 and the drain conduit 216 and consequently to the exterior of the system. Some hydrogen gas is evolved at the cathode 11 and proceeds with the catholyte into the upper compartment 85; and likewise, some oxygen gas is evolved at the anode 33 and proceeds with the anolyte into the upper compartment 85; which gases are separated from the mixture of the catholyte and the anolyte in the upper compartment 85 and accumulate in the gas pocket 90 in contact with the mass 118 of catalyst that is contained in the bag 119 arranged in the upper portion of the gas pocket 90; whereby a water-producing reaction is effected therebetween so as to bring about the disposal of the hydrogen and oxygen gases, the resulting water returning back into the mixture of the catholyte and the anolyte in the upper compartment 85 and being discharged therewith to the exterior via the drain fixture 114.

In this constructional embodiment of the hot water supply system, especially designed for home use, the tank 201 of the water heater 200 not only has a volume of 50 gallons, but the water heater 200 has a recovery capacity of at least 50 gallons per 24-hours; whereby this volume of water at ambient temperature (as low as 40° F.) may be heated to a temperature of at least 160° F. in a 24-hour period in the normal operation thereof. In the unit 10, the lower compartment 28 has a volume capable of storing about 4 gallons of demineralized water and normally there are about 5 gallons of demineralized water contained in the treatment compartment 32, whereby the unit 10 is in readiness to supply cold demineralized water to the storage tank 201 when the valve 214 is opened. Moreover, the unit 10 has a capacity of delivering about 5 gallons of demineralized water per minute, and has a latent capacity of demineralizing about 50 gallons of raw water from a hardness of about 800 p.p.m. to a hardness of only 35–40 p.p.m., when the ion exchange bed 101 is fully regenerated. Now the capacity of the power supply system is such that it is capable of bringing about the complete regeneration of the bed 101 in the time interval of 24-hours; whereby the recovery capacity of the unit 10 is also at least 50 gallons of raw water per 24-hours. Accordingly, the operating characteristics of the units 10 and 200 are matched and balanced, so that the water heater 200 is capable of heating in the 24-hour-period the 50 gallons of cold water, and so that the unit 10 is capable of demineralizing in the 24-hour-period the 50 gallons of raw water. In fact, the latent capacity to demineralize raw water of the ion exchange bed 101 is really greater than the effective hot water storage capacity of the storage chamber 205, since it is apparent that the incoming cold water into the storage chamber 205 reduces the temperature of the hot water stored in the lower portion thereof so that, as a practical matter, it is impossible to draw in one demand as much as 50 gallons of hot water from the storage tank 201 as the last 10 gallons or so of such water demand will be only tepid.

Accordingly, in the hot water supply system, if the hot water demand is confined to the heating capacity of the water heater 200, so that hot water is always drawn through the hot water supply pipe 213, then the demineralizing capacity of the unit 10 is never exceeded, so that the hot water thus drawn through the hot water supply conduit 213 is always fully demineralized; wherein full demineralization of the hot water is understood to mean that the total dissolved solids content thereof has been reduced to a value within the range 35–40 p.p.m.

In the event a sustained heavy demand for water should be made upon the hot water supply conduit 213, not only would the temperature of the water fall from hot to tepid and then to cold, by virtue of the fact that the heating capacity of the water heater 200 was exceeded, but also the demineralizing capacity of the unit 10 would be exceeded; whereby ultimately the ion exchange bed 101 would become totally saturated with respect to the ions of the contained salts, whereby the total dissolved solids content of the water drawn from the hot water supply conduit 213 would rapidly rise from the desired range (35–40 p.p.m.) and ultimately approach that of the raw water (800 p.p.m.).

In passing it is noted, that while there is some electrodialysis of the water passing through the treatment chamber 32 during a demand for water, the effect is really inconsequential, since this effect is small compared to the magnitude of the demand for water during a short time interval; whereby the unit 10 is capable of the rapid demineralization of the raw water at the high rate of demand for water only because of the latent ion exchange capacity of the ion exchange bed 101. However, the effect of the electrodialysis over a 24-hour-period is very substantial and is capable of bringing about the recharging of the ion exchange bed 101 in the manner previously explained. The continuous power requirements of the unit 100 is about 4 amperes at a D.C. voltage in the range 40–50 volts, or somewhat less than 200 watts; whereby the power requirements of the unit 10 are indeed modest, and are well within the normal limits of a plug-in device. Of course, the power requirements of the electric water heater 200 are substantial and well beyond the limits of a plug-in device. However, it is noted that the utilization in the hot water heating system, as shown in Fig. 6, of an electric water heater 200 is entirely for the purpose of illustration, as it is apparent that the water in the storage tank 201 may be heated by gas, oil, etc., since the particular mode of heating the water in the storage tank 201 forms no essential part of the present invention.

The foregoing discussion of the operating characteristics of the demineralizing unit 10 are based upon laboratory tests, wherein exceedingly hard test water having a total dissolved solids count of 800 p.p.m. was employed; which test water was produced by dissolving additional $CaCl_2$ in Chicago city water having an initial total dissolved solids count of 157 p.p.m. and a hardness calculated in terms of $CaCO_3$ of 125 p.p.m. Accordingly, these test conditions were exceedingly rigorous since hard water normally encountered in hard-water areas does not ordinarily contain a total dissolved solids count nearly so high as 800 p.p.m., or a hardness equivalency calculated in terms of $CaCO_3$ that in any way approximates that of this hard test water. Thus, the demineralizing unit 10 when operated to demineralize Chicago city water would have a demineralizing capacity in excess of 250 gallons per 24-hour period. Hence, the test conditions were exceedingly rigorous when it is considered that Los Angeles city water is considered to be very hard, since it contains a total dissolved solids count of 421 p.p.m. and a hardness equivalency calculated in terms of $CaCO_3$ of 274.

In the demineralization of hard water, the unit 10 removes such cations as: $Ca^{++}$, $Mg^{++}$, $Fe^{++}$, $Na^+$, $K^+$, etc., and such anions as: $HCO_3^-$, $SO_4^{--}$, $Cl^-$, $NO_3^-$, etc.; and, as previously explained, the various cations and anions of the electrolytes dissolved in the hard water are first removed by the ion exchange bed 101 in order to reduce the total dissolved solids content of the water undergoing treatment from about 800 p.p.m. to a value in the range 35–40 p.p.m. Subsequently, and as time proceeds, these cations and anions of the electrolytes mentioned are removed from the ion exchange bed 101, as the ion exchange bed 101 is regenerated, as previously explained, by the electrodialysis. In this regeneration of the ion exchange bed 101, it is postulated that the resins constitute solid poly-electrolytes for the transportation of the ions involved from the treatment chamber 32; and specifically, it is visualized that the cations are involved in a great multiplicity of exchanges with a considerable number of the individual cation exchange particles in their movements toward the cathode 11, and that the anions are involved in a great multiplicity of exchanges with a considerable number of the individual anion exchange particles in their movements toward the anode 33; the mechanism involved being visualized as like the mode involved in playing the child's game of "musical chairs." In this mechanism, it is suggested that the energy required to effect the successive ion exchanges of a great number of the ions in the mixed resin bed 101, and the consequent transportation of a given number of the ions out of the treatment chamber 32, is very small compared to the energy required to effect the direct migration of the same given number of ions from the treatment chamber 32, in the absence of the mixed resin bed 101, due fundamentally to the fact that in the direct migration of the ions, there must be a great amount of energy lost through random collision by the ions with water molecules and the ions must expend a great amount of work upon the dipolar water molecules in passing therethrough.

In any case, and without reference to the exact mechanism involved, the energy requirements of the unit 10, incorporating the mixed resin bed 101, to bring about a predetermined electrodialysis of a given volume of raw water of given hardness is greatly reduced with respect to conventional electrolytic apparatus, and this fact is immediately apparent by the tremendous reduction in the amount of heat developed in the unit 10. In other words, the temperature of the treated water in the lower compartment 28 after being subjected to the electrodialysis in the treatment chamber 32, is not substantially elevated above the ambient temperature; which characteristic is entirely different with respect to that of conventional electrolytic apparatus.

Of course, it follows that when the total dissolved solids count of the treated water delivered by the unit 10 to the water heater 200 has a value in the range 35–40 p.p.m., there is no formation of objectionable scale in the storage tank 201 and the water from the hot water supply conduit 213 is entirely suitable for all types of washing operations, without the noticeable formation of any insoluble calcium or magnesium salts of higher fatty acids (oleates, palmates, etc.) derived from soap products employed in such washing operations. Moreover, the total evaporation of this treated water carried by glassware, or the like, in automatic dishwashing apparatus leaves no noticeable salt residue to spot or stain the glassware. Thus, the demineralized water supplied from the hot water supply conduit 213 is entirely suitable for all household washing, cooking, etc., purposes and is not subject to the criticisms of such water that has been merely softened in conventional zeolite equipment.

In view of the foregoing, it is apparent that there has been provided a water demineralizing unit of improved construction and arrangement, as well as an improved hot water supply system incorporating the water demineralizing unit, the equipment being especially designed for home use and being entirely automatic so that it requires no re-charging or special care on the part of the user.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A water demineralizing unit comprising an upstanding substantially cylindrical cathode, a first upstanding substantially cylindrical barrier arranged within said cathode and spaced inwardly with respect thereto and cooperating therewith to define an upstanding substantially annular catholyte chamber therebetween, a second upstanding substantially cylindrical barrier arranged within said first barrier and spaced inwardly with respect thereto and cooperating therewith to define an upstanding substantially annular treatment chamber therebetween, an upstanding substantially rod-like anode arranged within said second barrier and spaced inwardly with respect thereto and cooperating therewith to define an upstanding substantially annular anolyte chamber therebetween, an upper insulating header sealed to the upper ends of said cathode and said first and second barriers and having a substantially centrally disposed opening therethrough receiving the upper end of said anode, a lower header sealed to the lower ends of said cathode and said first barrier and having an enlarged substantially centrally disposed opening therethrough, an upstanding insulating bushing arranged in the opening in said lower header and sealed thereto and also sealed to the lower end of said second barrier, a substantially annular insulating plate arranged in the lower end of said treatment chamber between said first and second barriers and above said lower header and cooperating therewith to define a compartment therebetween, said plate having holes therethrough communicating between said treatment chamber and said compartment, an upstanding substantially annular porous ion exchange bed arranged in said treatment chamber between said first and second barriers and above said plate, means for introducing raw water into the upper end of said treatment chamber, means for withdrawing treated water from said compartment, so that the water undergoing treatment passes downwardly through said treatment chamber into contact with said first and second barriers and through said ion exchange bed and into the holes in said plate into said compartment, whereby the water in said treatment chamber is subjected to ion exchange, means for conducting a first small portion of the treated water from said compartment as a catholyte upwardly through said catholyte chamber and into contact with said cathode and said first barrier and thence to drain, means for conducting a second small portion of the treated water from said compartment as an anolyte upwardly through said anolyte chamber and into contact with said second barrier and said anode and thence to drain, and a power supply source for conducting an electric current from said anode to said cathode through the water in said three chambers named and through said second and first barriers and through said ion exchange bed, whereby the water in said treatment chamber is also subjected to electrodialysis and said ion exchange bed is subjected to ion regeneration.

2. A water demineralizing unit comprising an upstanding substantially cylindrical cathode, a first upstanding substantially cylindrical barrier arranged within said cathode and spaced inwardly with respect thereto and cooperating therewith to define an upstanding substantially annular catholyte chamber therebetween, a second upstanding substantially cylindrical barrier arranged within said first barrier and spaced inwardly with respect thereto and cooperating therewith to define an upstanding substantially annular treatment chamber therebetween, an upstanding substantially rod-like anode arranged within said second barrier and spaced inwardly with respect thereto and cooperating therewith to define an upstanding substantially annular anolyte chamber therebetween, an upper insulating header sealed to the upper ends of said cathode and said first and second barriers and having a substantially centrally disposed opening therethrough receiving the upper end of said anode, a lower header sealed to the lower ends of said cathode and said first barrier and having an enlarged substantially centrally disposed opening therethrough, an upstanding insulating bushing arranged in the opening in said lower header and sealed thereto and also sealed to the lower end of said second barrier, a substantially annular insulating plate arranged in the lower end of said treatment chamber between said first and second barriers and above said lower header and cooperating therewith to define a compartment therebetween, said plate having holes therethrough communicating between said treatment chamber and said compartment, an upstanding substantially annular porous ion exchange bed arranged in said treatment chamber between said first and second barriers and above said plate, means for introducing raw water into the upper end of said treatment chamber, means for withdrawing treated water from said compartment, so that the water undergoing treatment passes downwardly through said treatment chamber into contact with said first and second barriers and through said ion exchange bed and into contact therewith and thence through the holes in said plate into said compartment, whereby the water in said treatment chamber is subjected to ion exchange, means including a first conduit for conducting a first small portion of the treated water from said compartment as a catholyte into the lower end of said catholyte chamber, means including a second conduit for conducting a second small portion of the treated water from said compartment as an anolyte into the lower end of said anolyte chamber, means including a drain conduit for conducting the catholyte from the upper end of said catholyte chamber and for conducting the anolyte from the upper end of said anolyte chamber, so that the catholyte passes upwardly through said catholyte chamber and into contact with said cathode and said first barrier and so that the anolyte passes upwardly through said anolyte chamber and into contact with said second barrier and said anode, and a power supply source for conducting an electric current from said anode to said cathode through the water in said three chambers named and through said second and first barriers and through said ion exchange bed, whereby the water in said treatment chamber is also subjected to electrodialysis and said ion exchange bed is subjected to ion regeneration.

3. The demineralizing unit set forth in claim 2, and further comprising a first check valve arranged in said first conduit for preventing the flow of the catholyte from said catholyte chamber back into said compartment, and a second check valve arranged in said second conduit for preventing the flow of the anolyte from said anolyte chamber back into said compartment.

4. A water demineralizing unit comprising an upstanding substantially cylindrical cathode, a first upstanding substantially cylindrical barrier arranged within said cathode and spaced inwardly with respect thereto and cooperating therewith to define an upstanding substantially annular catholyte chamber therebetween, a second upstanding substantially cylindrical barrier arranged within said first barrier and spaced inwardly with respect thereto and cooperating therewith to define an upstanding substantially annular treatment chamber therebetween, an upstanding substantially rod-like anode arranged within said second barrier and spaced inwardly with respect thereto and cooperating therewith to define an upstanding substantially annular anolyte chamber therebetween, an upper insulating header sealed to the upper ends of said cathode and said first and second barriers and having a substantially centrally disposed opening therethrough receiving the upper end of said anode, a lower header sealed to the lower ends of said cathode and said first barrier and having an enlarged substantially centrally disposed opening therethrough, an upstanding insulating bushing arranged in the opening in said lower header and sealed thereto and also sealed to the lower end of said second barrier, a substantially annular insulating plate arranged in the lower end of said treatment chamber between said first and second barriers and above said lower header and cooperating therewith to define a compartment therebetween, said plate having holes therethrough communicating between said treatment chamber and said compartment, a substantially annular porous gravel bed arranged in the lower end of said treatment chamber between said first and second barriers and supported upon said plate, an upstanding substantially annular porous ion exchange bed arranged in said treatment chamber between said first and second barriers and supported upon said gravel bed, means for introducing raw water into the upper end of said treatment chamber, means for withdrawing treated water from said compartment, so that the water undergoing treatment passes downwardly through said treatment chamber into contact with said first and second barriers and through said ion exchange bed and into contact therewith and through said gravel bed and thence through the holes in said plate into said compartment, said gravel bed preventing the treated water from washing said ion exchange bed from the lower portion of said treatment chamber through the holes in said plate downwardly into said compartment, means for conducting a first small portion of the treated water from said compartment as a catholyte upwardly through said catholyte chamber and into contact with said cathode and said first barrier and thence to drain, means for conducting a second small portion of the treated water from said compartment as an anolyte upwardly through said anolyte chamber and into contact with said second barrier and said anode and thence to drain, and a power supply source for conducting an electric current from said anode to said cathode through the water in said three chambers named and through said second and first barriers and through said ion exchange bed, whereby the water in said treatment chamber is also subjected to electro-dialysis and said ion exchange bed is subjected to ion regeneration.

5. A water demineralizing unit comprising an upstanding tubular cathode, a first upstanding tubular barrier arranged within said cathode and spaced inwardly with respect thereto cooperating therewith to define an upstanding catholyte chamber therebetween, a second upstanding tubular barrier arranged within said first barrier and spaced inwardly with respect thereto and cooperating therewith to define an upstanding treatment chamber therebetween, said second barrier also defining an upstanding anolyte chamber therein, an upstanding anode arranged within said anolyte chamber and spaced inwardly with respect to said second barrier, an upper insulating header sealed to the upper ends of said cathode and said first and second barriers, a lower insulating header sealed to the lower ends of said cathode and said first and second barriers, an upstanding porous ion exchange bed arranged in said treatment chamber between said first and second barriers and above said lower header, means for introducing raw water into the upper end of said treatment chamber, means for withdrawing treated water from the lower end of said treatment chamber, so that the water undergoing treatment passes downwardly through said treatment chamber into contact with said first and second barriers and through said ion exchange bed and into contact therewith, whereby the water in said treatment chamber is subjected to ion exchange, an upstanding substantially bell-shaped dome sealed to said upper header and cooperating therewith to define a compartment therebetween, means for conducting a first stream of water as a catholyte upwardly through said catholyte chamber and into contact with said cathode and said first barrier and thence into said compartment, means for conducting a second stream of water as an anolyte upwardly through said anolyte chamber and into contact with said second barrier and said anode and thence into said compartment, means including a drain fixture carried by said dome for discharging to the exterior the mixture of the catholyte and the anolyte in said compartment, and a power supply source for conducting an electric current from said anode to said cathode through the water in said three chambers named and through said second and first barriers and through said ion exchange bed, whereby the water in said treatment chamber is also subjected to electrodialysis and said ion exchange bed is subjected to ion regeneration.

6. The demineralizing unit set forth in claim 5, wherein said drain fixture is carried intermediate the lower and upper ends of said dome so as to define a gas pocket in the upper end of said dome disposed above the mixture of the catholyte and the anolyte in said compartment, and further comprising a mass of catalyst disposed in said gas pocket for promoting a water-producing reaction between any hydrogen and oxygen gases accumulating in said gas pocket.

7. The demineralizing unit set forth in claim 6, wherein said mass of catalyst is confined in a porous bag arranged in said gas pocket.

8. A water demineralizing unit comprising an upstanding tubular cathode, a first upstanding tubular barrier arranged within said cathode and spaced inwardly with respect thereto and cooperating therewith to define an upstanding catholyte chamber therebetween, a second upstanding tubular barrier arranged within said first barrier and spaced inwardly with respect thereto and cooperating therewith to define an upstanding treatment chamber therebetween, said second barrier also defining an upstanding anolyte chamber therein, an upstanding anode arranged within said anolyte chamber and spaced inwardly with respect to said second barrier, an upper insulating header sealed to the upper ends of said cathode and said first and second barriers, a lower insulating header sealed to the lower ends of said cathode and said first and second barriers, an upstanding porous ion exchange bed arranged in said treatment chamber between said first and second barriers and above said lower header, means for introducing raw water into the upper end of said treatment chamber, means for withdrawing treated water from the lower end of said treatment chamber, so that the water undergoing treatment passes downwardly through said treatment chamber into contact with said first and second barriers and through said ion exchange bed and into contact therewith, whereby the water in said treatment chamber is subjected to ion exchange, an upstanding substantially bell-shaped dome sealed to said upper header and cooperating therewith to define a compartment therebetween, said dome including lower and upper sections sealed together and respectively formed of relatively strong material and relatively weak material, so that said upper dome section formed of relatively weak material constitutes an explosion head capable of preferential rupture in the event of an abnormally high and unsafe pressure in said upper compartment, means for conducting a first stream of water as a catholyte upwardly through said catholyte chamber and into contact with said cathode and said first barrier and thence into said compartment, means for conducting a second stream of water as an anolyte upwardly through said anolyte chamber and into contact with said second barrier and said anode and thence into said compartment, means including a drain fixture carried by said lower dome section for discharging to the exterior the mixture of the catholyte and the anolyte in said upper compartment, and a power supply source for conducting an electric current from said anode to said cathode through the water in said three chambers named and through said second and first barriers and through said ion exchange bed, whereby the water in said treatment chamber is also subjected to electrodialysis and said ion exchange bed is subjected to ion regeneration.

9. The demineralizing unit set forth in claim 8, wherein said lower dome section is formed of steel sheet and said upper dome section is formed of lead sheet.

10. A water demineralizing unit comprising an upstanding tubular cathode, a first upstanding tubular barrier arranged within said cathode and spaced inwardly with respect thereto and cooperating therewith to define an upstanding catholyte chamber therebetween, a second upstanding tubular barrier arranged within said first barrier and spaced inwardly with respect thereto and cooperating therewith to define an upstanding treatment chamber therebetween, said second barrier also defining an upstanding anolyte chamber therein, an upstanding anode arranged within said anolyte chamber and spaced inwardly with respect to said second barrier, an upper insulating header sealed to the upper ends of said cathode and said first and second barriers, a lower insulating header sealed to the lower ends of said cathode and said first and second barriers, an upstanding porous ion exchange bed arranged in said treatment chamber between said first and second barriers and above said lower header, means for introducing raw water into the upper end of said treatment chamber, means for withdrawing treated water from the lower end of said treatment chamber, so that the water undergoing treatment passes downwardly through said treatment chamber into contact with said first and second barriers and through said ion exchange bed and into contact therewith, whereby the water in said treatment chamber is subjected to ion exchange, an upstanding substantially bell-shaped dome sealed to said upper header and cooperating therewith to define a compartment therebetween, an upstanding tubular baffle arranged in said compartment and spaced inwardly from said dome, the lower end of said baffle being sealed to said upper header and the upper end of said baffle terminating below said dome, whereby said baffle divides the lower portion of said compartment into inner and outer sections commonly communicating with the upper portion of said compartment, means for conducting a first stream of water as a catholyte upwardly through said catholyte chamber and into contact with said cathode and said first barrier and thence into the outer lower section of said compartment, means for conducting a second stream of water as an anolyte upwardly through said anolyte chamber and into contact with said second barrier and said anode and thence into the inner lower section of said compartment, a drain fixture carried by said dome below the upper end of said baffle, whereby the anolyte conducted into the inner lower section of said compartment spills over the top end of said baffle into the catholyte conducted into the outer lower section of said compartment and the mixture is conducted from said compartment via said drain fixture to the exterior, and a power supply source for conducting an electric current from said anode to said cathode through the water in said three chambers named and through said second and first barriers and through said ion exchange bed, whereby the water in said treatment chamber is also subjected to electrodialysis and said ion exchange bed is subjected to ion regeneration.

11. A water supply system comprising: a demineralizing unit including structure defining first and second and third chambers and provided with a first barrier as a common wall between said first and second chambers and a second barrier as a common wall between said first and third chambers, a porous ion exchange bed arranged in said first chamber in interposed relation with respect to said first and second barriers and consisting essentially of a loosely packed mass of first discrete particles of synthetic organic polymeric cation exchange resin and of second discrete particles of synthetic organic polymeric anion exchange resin, an anode in said second chamber, and a cathode in said third chamber; a heating unit including structure defining a storage chamber, and means for heating water contained in said storage chamber; a first pipe containing a supply of cold raw water under pressure and connected to the inlet of said first chamber; a connection between the outlet of said first chamber and the inlet of said storage chamber; a second pipe containing hot demineralized water under pressure and connected to the outlet of said storage chamber; a drain pipe; first conduit means for conducting a first stream of water from said first pipe through said second chamber into contact with said anode and said first barrier and thence into said drain pipe; second conduit means for conducting a second stream of water from said first pipe through said third chamber into contact with said cathode and said second barrier and thence into said drain pipe; a valve for controlling the flow of hot demineralized water from said second pipe to the exterior, whereby opening and subsequent closing of said valve brings about the flow of a corresponding volume of cold raw water from said first pipe into said first chamber and the flow of such volume of cold demineralized water from said first chamber into said storage chamber and the flow of such volume of hot demineralized water from said storage chamber into said second pipe and therefrom to the exterior, so that the water flowing through said first chamber is in contact with said first and second barriers and with said bed in order that the positive and negative ions of the salts dissolved in the raw water admitted into said first chamber are quickly exchanged by said bed for hydrogen and hydroxyl ions carried thereby so as quickly to demineralize the water with the result that the ion exchange capacity of said bed is quickly reduced incident to opening of said valve; and a power source for conducting a direct current from said anode to said cathode through said first and second barriers and through the water respectively in said second and first and third chambers, whereby said ion exchange bed is subjected to ion regeneration in that the positive and negative ions of the salts mentioned carried by said bed are gradually re-exchanged for hydrogen and hydroxyl ions of the water in said first chamber and subjected to electrodialysis so that they are transported into the respective second and first streams of water passing through the respective third and second chambers and respectively carried thereby into said drain pipe with the result that the ion exchange capacity of said bed is gradually increased subsequent to reclosing of said valve.

12. A water supply system comprising: a demineralizing unit including structure defining first and second and third chambers and provided with a first barrier as a common wall between said first and second chambers and a second barrier as a common wall between said first and third chambers, a porous ion exchange bed arranged in said first chamber in interposed relation with respect to said first and second barriers and consisting essentially of a loosely packed mass of first discrete particles of synthetic organic polymeric cation exchange resin and of second discrete particles of synthetic organic polymeric anion exchange resin, an anode in said second chamber, and a cathode in said third chamber; a heating unit including structure defining a storage chamber, and means for heating water contained in said storage chamber; a first pipe adapted to contain a supply of cold raw water under pressure and connected to the inlet of said first chamber; a connection between the outlet of said first chamber and the inlet of said storage chamber; a second pipe adapted to contain hot demineralized water under pressure and connected to the outlet of said storage chamber; a drain pipe; first conduit means for conducting a first stream of water from said first pipe through said second chamber into contact with said anode and said first barrier and thence into said drain pipe; second conduits means for conducting a second stream of water from the outlet of said first chamber through said third chamber into contact with said cathode and said second barrier and thence into said drain pipe; a valve for controlling the flow of hot demineralized water from said second pipe to the exterior, whereby opening and subsequent closing of said valve brings about the flow of a corresponding volume of cold raw water from said first pipe into said first chamber and the flow of such volume of cold demineralized water from said first chamber into said storage chamber and the flow of such volume of hot demineralized water from said storage chamber into said second pipe and therefrom to the exterior, so that the water flowing through said first chamber is in contact with said first and second barriers and with said bed in order that the positive and negative ions of the salts dissolved in the raw water admitted into said first chamber are quickly exchanged by said bed for hydrogen and hydroxyl ions carried thereby so as quickly to demineralize the water with the result that the ion exchange capacity of said bed is quickly reduced incident to opening of said valve; and a power source for conducting a direct current from said anode to said cathode through said first and second barriers and through the water respectively in said second and first and third chambers, whereby said ion exchange bed is subjected to ion regeneration in that the positive and negative ions of the salts mentioned carried by said bed are gradually re-exchanged for hydrogen and hydroxyl ions of the water in said first chamber and subjected to electrodialysis so that they are transported into the respective second and first streams of water passing through the respective third and second chambers and respectively carried thereby into said drain pipe with the result that the ion exchange capacity of said bed is gradually increased subsequent to reclosing of said valve.

13. A water demineralizing unit comprising a metal tank provided with an upstanding tubular side wall and a bottom end wall, said side wall constituting a first electrode, upstanding tubular metal structure arranged with the lower end of said side wall and spaced inwardly with respect thereto and carried by and sealed to said bottom end wall, a first upstanding tubular barrier arranged within said side wall and spaced inwardly with respect thereto and carried by and sealed to the upper portion of said structure, said structure and said first barrier cooperating with said side wall to define a first upstanding chamber therebetween, an upstanding insulator arranged within said structure and spaced inwardly with respect thereto and carried by and sealed to said bottom end wall, a second upstanding tubular barrier arranged within said first barrier and spaced inwardly with respect thereto and carried by and sealed to the upper portion of said insulator, said insulator and said second barrier cooperating with said structure and said first barrier to define a second upstanding chamber therebetween, said second barrier also defining a third upstanding chamber therein and disposed above said insulator, an upstanding second electrode arranged in said third chamber, an insulating plate arranged in the lower portion of said second chamber and disposed above said bottom end wall and extending between the upper portion of said structure and the upper portion of said insulator and cooperating therewith to divide said second chamber into an upper water treatment compartment and a lower treated water storage compartment, said plate having a number of passages formed therethrough and placing said first and second compartments in communication with each other, means for conducting a first stream of water through said first chamber into contact with said first eelctrode and said first barrier, means for conducting a second stream of water through said third chamber into contact with said second barrier and said second electrode, an upstanding porous ion exchange bed arranged in said upper compartment and supported by said plate and extending between said first and second barriers, means for introducing raw water into the upper end of said upper compartment, means for withdrawing treated water from said lower compartment, so that the water undergoing treatment passes downwardly through said upper compartment into contact with said first and second barriers and through said ion exchange bed and into contact therewith and thence through the passages in said plate into said lower compartment, whereby the water in said upper compartment is subjected to ion exchange, a power supply source for conducting an electric current from one of said electrodes to the other of said electrodes and through the water in said first and third chambers and in said upper compartment and through said first and second barriers and through said ion exchange bed, whereby the water in said upper compartment is also subjected to electrodialysis and said ion exchange bed is subjected to regeneration, said side wall and said bottom wall and said structure being electrically connected together, so that they are at substantially the same potential, and means including insulating coatings carried by the interior surface of said bottom end wall and by the inner and outer surfaces of said structure for minimizing the passage of electric current between said second electrode and said bottom end wall and said structure in order to maximize the passage of electric current between said first and second electrodes and consequently through said ion exchange bed.

14. A water demineralizing unit comprising a tank provided with an upstanding substantially cylindrical side wall constituting a cathode, a first upstanding substantially cylindrical self-supporting ion-permeable barrier arranged within said cathode and spaced inwardly with respect thereto and cooperating therewith to define an upstanding substantially annular catholyte chamber therebetween, a second upstanding substantially cylindrical self-supporting ion-permeable barrier arranged within said first barrier and spaced inwardly with respect thereto and cooperating therewith to define an upstanding substantially annular treatment chamber therebetween, an upstanding anode arranged within said second barrier and spaced inwardly with respect thereto and cooperating therewith to define an upstanding substantially annular anolyte chamber therebetween, means for rendering water-tight said treatment compartment, said last-mentioned means including an upper insulating header arranged in the upper end of said tank and sealed to the upper ends of said first and second barriers and a lower insulating header arranged in the lower end of said tank and sealed to the lower ends of said first and second barriers, an upstanding substantially annular ion exchange bed arranged in said treatment chamber and supported by said lower insulating header and disposed between said first and second barriers and in contact therewith, said ion exchange bed being porous to accommodate the flow of water therethrough and being characterized by both cation exchange and anion exchange, means for introducing raw water under pressure into one end of said treatment chamber, means for withdrawing treated water under pressure from the other end of said treatment chamber, so that the water under pressure and undergoing treatment passes longitudinally through said treatment chamber and into contact with said first and second barriers and through said porous ion exchange bed and into ion exchange contact therewith, whereby the water under pressure in said treatment chamber is subjected to both cation exchange and anion exchange, means for conducting a first stream of water as a catholyte longitudinally through said catholyte chamber and into contact with said cathode and said first barrier, means for conducting a second stream of water as an anolyte longitudinally through said anolyte chamber and into contact with said second barrier and said anode, and means for impressing an electrical potential between said anode and said cathode, whereby the water under pressure in said treatment chamber is also subjected to electrodialysis and whereby said ion exchange bed is subjected to both cation and anion regeneration; and wherein said first barrier is of composite construction comprising an outer substantially sleeve-like support having perforations therein, and an inner substantially sleeve-like diaphragm formed of close cellulosic material, whereby said support prevents rupture of said diaphragm under the outward pressure of the water in said treatment chamber and due to the weight of the water and said porous ion exchange bed in said treatment chamber.

15. The water demineralizing unit set forth in claim 14, wherein said diaphragm consists essentially of a sheet of wood wrapped into sleeve-like form interiorly of said support.

16. The water demineralizing unit set forth in claim 15, wherein the wood of said diaphragm is selected from the class consisting of poplar, Douglas fir and white pine.

17. A water demineralizing unit comprising a tank provided with an upstanding substantially cylindrical side wall constituting a cathode, a first upstanding substantially cylindrical self-supporting ion-permeable barrier arranged within said cathode and spaced inwardly with respect thereto and cooperating therewith to define an upstanding substantially annular catholyte chamber therebetween, a second upstanding substantially cylindrical self-supporting ion-permeable barrier arranged within said first barrier and spaced inwardly with respect thereto and cooperating therewith to define an upstanding substantially annular treatment chamber therebetween, an upstanding anode arranged within said second barrier and spaced inwardly with respect thereto and cooperating therewith to define an upstanding substantially annular anolyte chamber therebetween, means for rendering water-tight said treatment compartment, said last-mentioned means including an upper insulating header arranged in the upper end of said tank and sealed to the upper ends of said first and second barriers and a lower insulating header arranged in the lower end of said tank and sealed to the lower ends of said first and second barriers, an upstanding substantially annular ion exchange bed arranged in said treatment chamber and supported by said lower insulating header and disposed between said first and second barriers and in contact therewith, said ion exchange bed being porous to accommodate the flow of water therethrough and being characterized by both cation exchange and anion exchange, means for introducing raw water under pressure into one end of said treatment chamber, means for withdrawing treated water under pressure from the other end of said treatment chamber, so that the water under pressure and undergoing treatment passes longitudinally through said treatment chamber and into contact with said first and second barriers and through said porous ion exchange bed and into ion exchange contact therewith, whereby the water under pressure in said treatment chamber is subjected to both cation exchange and anion exchange, means for conducting a first stream of water as a catholyte longitudinally through said catholyte chamber and into contact with said cathode and said first barrier, means for conducting a second stream of water as an anolyte longitudinally through said anolyte chamber and into contact with said second barrier and said anode, and means for impressing an electrical potential between said anode and said cathode, whereby the water under pressure in said treatment chamber is also subjected to electrodialysis and whereby said ion exchange bed is subjected to both cation and anion regeneration; and wherein said second barrier is of composite construction comprising a substantially sleeve-like support having perforations therein, and an outer substantially sleeve-like diaphragm formed of close cellulosic material, whereby said support prevents rupture of said diaphragm under the inward pressure of the water in said treatment chamber and due to the weight of the water and said porous exchange bed in said treatment chamber.

18. The water demineralizing unit set forth in claim 17, wherein said diaphragm consists essentially of a sheet of wood wrapped into sleeve-like form exteriorly of said support.

19. The water demineralizing unit set forth in claim 18, wherein the wood of said diaphragm is selected from the class consisting of poplar, Douglas fir and white pine.

References Cited in the file of this patent

UNITED STATES PATENTS

| 2,057,232 | Endell | Oct. 13, 1936 |
| 2,093,770 | Billiter | Sept. 21, 1937 |
| 2,502,614 | Zender | Apr. 4, 1950 |
| 2,593,915 | Pavelka | Apr. 22, 1952 |
| 2,687,997 | Marchand | Aug. 31, 1954 |
| 2,739,938 | Wiechers | Mar. 27, 1956 |
| 2,763,607 | Staverman | Sept. 18, 1956 |
| 2,788,319 | Pearson | Apr. 9, 1957 |
| 2,815,320 | Kollsman | Dec. 3, 1957 |

FOREIGN PATENTS

| 702,316 | Great Britain | Jan. 13, 1954 |
| 675,253 | Great Britain | July 9, 1952 |
| 73,121 | Holland | July 30, 1953 |

OTHER REFERENCES

Binai: "Plating," vol. 39, No. 10, October 1952, page 1121.